United States Patent [19]
Hickey

[11] 3,879,112
[45] Apr. 22, 1975

[54] ADJUSTABLE MIRROR MOUNT
[75] Inventor: Roy E. Hickey, Honeoye Falls, N.Y.
[73] Assignee: The Singer Company, New York, N.Y.
[22] Filed: May 29, 1973
[21] Appl. No.: 364,471

[52] U.S. Cl. ................. 350/288; 350/310; 350/84; 356/106 R
[51] Int. Cl. ............................................ G02b 5/08
[58] Field of Search ............ 350/288, 299, 310, 84; 74/89, 15; 248/180, 183, 278; 267/47, 165; 356/106 R

[56] References Cited
UNITED STATES PATENTS

| | | | |
|---|---|---|---|
| 3,220,270 | 11/1965 | Lebowsky | 356/106 |
| 3,402,613 | 9/1968 | Neusel | 350/84 |
| 3,407,018 | 10/1968 | Miller | 350/310 |
| 3,478,608 | 11/1969 | Met | 350/310 |
| 3,601,476 | 8/1971 | Mackenzie | 350/310 |

*Primary Examiner*—Alfred E. Smith
*Assistant Examiner*—Michael J. Tokar

[57] ABSTRACT

A simple and inexpensive, adjustable mirror assembly having independent adjustments which do not significantly affect the optical path length of an associated optical system is provided by an assembly that includes a member having a light reflective surface including means to resiliently bias the member against a pivot point. First means adjustably rotate the reflecting surface about a first axis passing through the pivot point and second means adjustably rotate the reflecting surface about a second axis perpendicular to the first axis with the second axis also passing through the pivot point.

8 Claims, 6 Drawing Figures

ADJUSTABLE MIRROR MOUNT

BACKGROUND OF THE INVENTION

1. Field Of The Invention

This invention relates to adjustable light reflective surfaces and more particularly to an adjustable mirror mount for use in optical systems in which the optical path is folded one or more times.

2. Description Of The Prior Art

In various image projection systems, it is desirable to have a relatively large projected image and at the same time have the projected image located relatively close to the source of the projected image. This is generally accomplished by folding the projected image optical path one or more times by use of light reflective surfaces such as mirrors. In order to insure that the projected image is clearly focused, undistorted and properly located at the display surface, the mirror(s) used must be accurately placed and oriented. The necessary manufacturing tolerances and techniques needed to obtain the desired accuracy for fixed position mirrors, however, can be costly. Accordingly, one or more of the mirrors are usually adjustably mounted. It is desirable that such adjustable mirror mounts be simple and inexpensive, have no significant affect on the optical path length of the optical system in which they are used and that the orienting adjustments be independent of one another.

Accordingly, one object of this invention is to provide an improved adjustable mirror mount.

Another object of this invention is to provide a simple and inexpensive adjustable mirror mount.

A further object of this invention is to provide an adjustable mirror assembly having adjustments that are independent of one another.

A still further object of this invention is to provide an adjustable mirror mount assembly that has little or no affect on the optical path length of the optical system in which it is utilized.

SUMMARY OF THE INVENTION

Briefly described, the above and other objects, advantages and characteristics of the present invention are obtained by an adjustable assembly which includes a member having a light reflective surface. Resilient biasing means urge the member against a pivot point such that first means adjustably rotates the reflective surface about a first axis which passes through the pivot point. Similarly, second means adjustably rotates the reflecting surface about a second axis substantially perpendicular to the first axis and which also passes through the pivot point.

More specifically, the light reflective surface may comprise a mirror mounted on one side of a member with the other side of the member being in contact with the pivot. Extensions of the member enable the first and second adjusting means to be coupled between the member and a base. Another extension of the member provides means for mounting a resilient, spring biasing means that urges the member against the pivot point.

BRIEF DESCRIPTION OF THE DRAWINGS

The various features, objects and advantages of the present invention will be apparent from consideration of the detailed description set forth hereinbelow taken in conjunction with the following drawings, wherein like reference characters designate like or corresponding parts throughout the several views, and wherein.

DESCRIPTION OF THE PREFERRED EMBODIMENT

Figure 1:
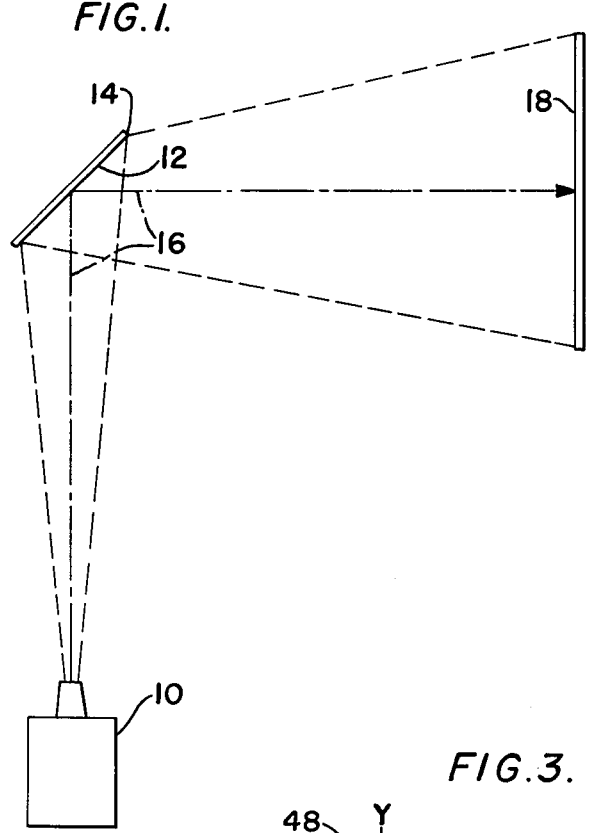
FIG. 1 illustrates a typical image projection, optical system in which the present invention may be utilized.

Referring now to FIG. 1, there is shown a schematic representation of an image projection, optical system wherein the optical path is folded once. It is to be understood, however, that the present invention is not limited to such a system, but may be utilized whenever it is desirable to have an adjustable light reflective surface, and in other optical systems wherein the optical path is folded one or more times. An image projected by an image source 10 is displaced by 90° by a light reflective surface 12, which may be provided by a mirror 14, before being projected onto a display surface or viewing screen 18. The desired center of the optical path of the projected image is shown by the line 16.

Figure 2:
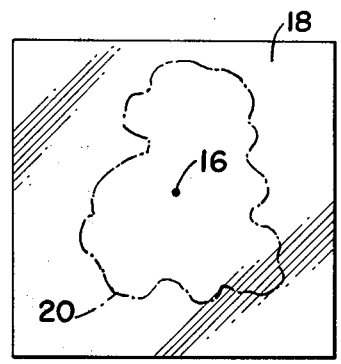
FIG. 2 illustrates the image display surface of the image projection, optical system shown in FIG. 1.

If the mirror 14 is properly positioned, the image 20 appearing on the screen 18 (FIG. 2) will be centered about the desired optical center line 16 of the optical system. For this condition, each point of the displayed image 20 equally distant from the desired optical center line 16 has an equal optical path length from the image source 10.

In the event that the mirror 14 is not properly positioned, the image 20 appearing on the screen 18 will not be centered around the desired optical center line 16 of the optical system. This results in (1) the projected image 20 being displaced from the desired position on the screen 18 by an amount directly related to the improper positioning of the mirror 14, and in (2) points of the image 20 equally distant from the desired optical center line 16 no longer having equal optical path lengths. This causes the image 20 to be distorted, i.e., becoming larger for longer optical path lengths and smaller for shorter optical path lengths. This distortion is sometimes called "keystone" distortion. In some optical systems, undesirable image rotation may also be caused by improper mirror orientation.

In various optical systems, it is very desirable that any adjusting means provided to correct the position of the mirror 14 be such that the adjustments do not cause any change in the total optical path length. Full control of the mirror 14 position will generally require more than one adjustment and it is very desirable that the required adjustments be independent so that one adjustment has no affect on the other adjustment(s). At the same time, it is desirable that an adjustable mounting system having these desirable features be simple and inexpensive to fabricate and be readily adjustable.

Figure 3:
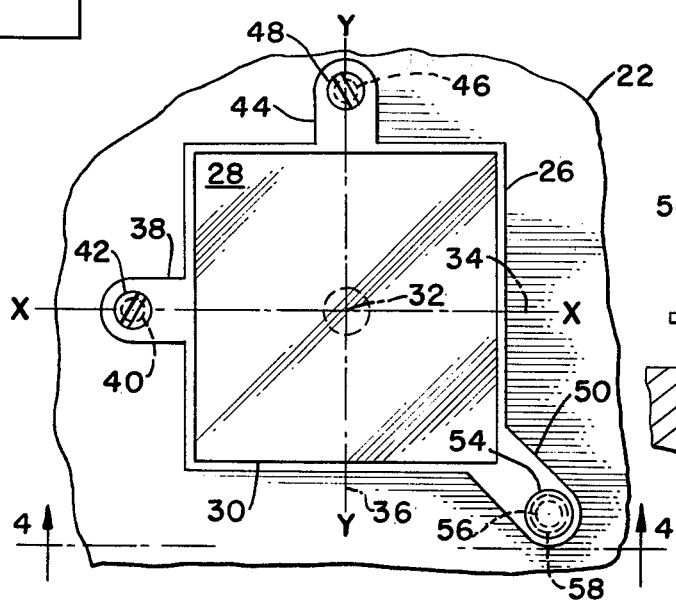
FIG. 3 is a plan view of an adjustable mirror mount in accordance with the present invention.
Figure 5:
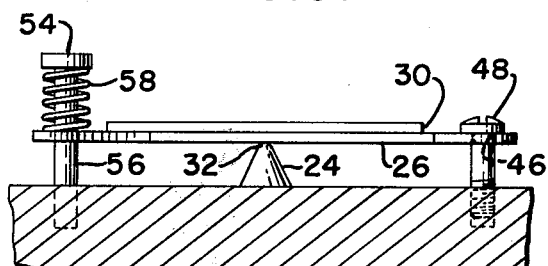
FIG. 5 is a side elevation view of the apparatus shown in FIG. 4 looking in the direction of the arrows 5—5.
Figure 4:
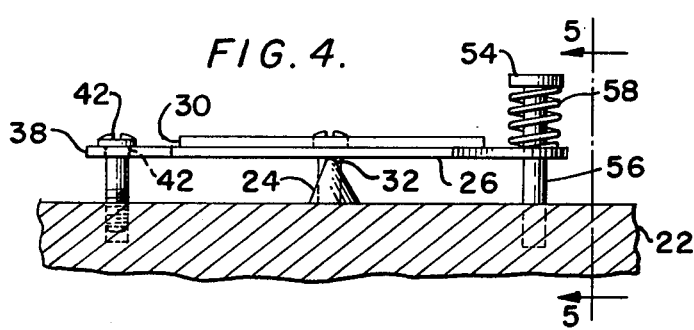
FIG. 4 is a side elevation view of the apparatus shown in FIG. 3 looking in the direction of the arrows 4—4.

An adjustable reflective surface mounting assembly having the desirable features set forth above is shown in FIGS. 3, 4 and 5 as including a base 22 which may be part of a structure associated with an optical system (not shown). Extending from the base is a pivot 24 having a slightly rounded point at the end thereof. Contacting the end of the pivot in essentially point contact 32 is a flat member 26. The surface of the member 26 not in contact with the pivot 24 has a light reflective surface 28. This surface 28 can be obtained by polishing the surface of the member 26 or by securing a mirror 30 to the surface of the member 26 not in contact with the pivot 24 by any number of well known means (not shown). The apparatus illustrated in FIGS. 3, 4 and 5 has a first axis 34 of rotation along an $x$ axis which passes through the point contact 32 between the member 26 and the pivot 24. A second axis 36 of rotation is along a $y$ axis, i.e., substantially perpendicular to the first axis 34 of rotation, with the second axis 36 of rotation also passing through the point of contact 32 of the pivot 24 with the member 26. The intersection of the first axis 34 of rotation with the second axis 36 of rotation may correspond to the center line (not shown) of the optical system in which the adjustable mirror mount is to be utilized.

An extension 38 of the member 26 has an opening 40 therein the center of which is in line with the first axis 34 of rotation. An adjusting screw 42 extends through the opening 40 and is in threaded engagement with the base 22 for rotating the light reflecting surface 28 about the second axis 36 of rotation. A similar extension 44 of the member 26 has an opening therein 46 the center of which is in line with the second axis 36 of rotation and enables an adjusting screw 45, extending therethrough and in threaded engagement with the base 22, to rotate the light reflective surface 28 around the first axis 34 of rotation. A further extension 50 of the member 26 contains an opening 52 therein through which extends a post 56, one end of which is secured to the base 22 by any number of well known means (not shown). The other end of the post 56 extends through the opening 52 in the extension 50 and terminates in a shoulder or flanged portion 54. Located intermediate the extension 50 and the shoulder 54 is a resilient coil spring 58 that urges the member 26 against the pivot 24. The center of the opening 52 on the extension 50 is located along a line extension (not shown) that substantially bisects the angle between the first 34 and second 36 rotational axis along which the adjusting screws 42 and 48, respectively, are located, with the opening 50 being located away from or remote from both the intersection of the first 34 and second 36 rotational axis and the adjusting screws 42 and 48, as shown. By locating the extension 50 containing the biasing means 58 on a line extension that bisects the angle between the extensions 38 and 44 associated with the adjusting means 42 and 48, the load is equally divided between the adjusting means 42 and 48.

The operation of the adjustable mirror mount shown in FIGS. 3, 4 and 5 is such that rotation of the adjusting screw 42 into the base 22 causes rotation (FIG. 4) of the light reflective surface 28 around the second axis 36 with consequent compression of the biasing spring 58. Conversely, rotation of the adjusting screw 42 out of the base 22 results in rotation of the reflective surface 28 around the second axis 36 under urging of the now expanding bias spring 58. Since rotation of the adjusting screw 42 only results in rotation around the second axis 36, the position of the reflecting surface 28 with regard to the first rotational axis 34 is virtually undisturbed.

In a like manner, rotation of the second adjusting screw 48 into the base 22 results in rotation of the reflective surface 28 around the first rotational axis 34 (FIG. 5) with resulting compressure of the spring 58. Similarly, rotation of the second adjusting screw 48 out of the base 22 results in rotation of the reflective surface 28 around the first rotational axis 34 under the urging of the now expanding spring 58. Since rotation of the light reflective surface 28 due to adjustment of the second adjusting screw 48 is only around the first rotational axis 34, the adjustment of the reflecting surface 28 around the second rotational axis 36 is virtually undisturbed. Since the pivot point 32 is located at the center of the optical path, positioning the light reflective surface 28 by adjustment of the adjusting screws 42 and 48 does not have any significant affect on the length of the optical path of the projected image which is reflected by the reflective surface 28.

Figure 6:
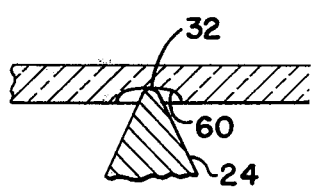
FIG. 6 illustrates one modification of the apparatus shown in FIGS. 3, 4 and 5.

As shown in FIGS. 4 and 5, the light reflecting surface 28 is spaced slightly above the pivot point 32. As will be apparent to those skilled in the art, this slight separation will introduce some optical path length errors, however slight. However, this distortion can be virtually eliminated by reducing the distance between the light reflecting surface 28 and the pivot point 32. One way of accomplishing this is illustrated in FIG. 6 which shows an indention 60 in the back portion of the frame 26 which allows the pivot point 32 to approach the plane of the light reflecting surface 28. Also, by threadedly engaging the pivot 24 in the base 22, the height of the pivot point 32 can be made adjustable to vary the optical path length of the system, if desired.

As will be apparent to those skilled in the art, the light reflecting surface need not be a square as is illustrated in FIG. 3. It only is necessary that the light reflecting surface 28 be large enough to encompass the optical image projected thereon. Further, the light reflecting surface 28 need not be perpendicular to the longitudinal axis of the adjusting screws 42 and 48 and the post 56. Additionally, another post 56 and spring 58 can be utilized, if desirable, at the other side of the member 26 and along the line on which the post 56 and spring 58 are located.

As will be apparent from the description contained hereinabove, rotation of the reflective surface 28 about one of the rotational axis by means of the associated adjusting screw has no significant affect on the adjustment made by the other adjusting screw. Additionally, as described above, orientation adjustment of the reflective surface 28 does not significantly affect the length of the optical path of the optical system in which the adjustable reflective surface 28 may be utilized. As shown by FIGS. 3, 4 and 5, these objectives are accomplished with the use of two adjusting screws 42 and 48, one bias spring 48 and associated mounting post 56. This results in the apparatus described being simple and inexpensive to manufacture.

Other embodiments and modifications of the device described will be apparent to those skilled in the art without departing from the spirit and scope of this invention as defined by the appended claims.

What is claimed is:

1. An adjustable light reflective surface for an image projection system having an optical center line comprising:

a member having a light reflective surface; a pivot point adjacent said light reflective surface and substantially in line with said optical center line of said projector system;

means to resiliently bias said member against said pivot point;

first means for adjustably rotating said member about a first axis passing through said pivot point;

second means for adjustably rotating said member about a second axis substantially perpendicular to said first axis and also passing through said pivot point.

2. The apparatus according to claim 1 wherein:
said light reflective surface includes a mirror.

3. The apparatus according to claim 1 wherein:
said first adjusting means and said pivot establish said second axis; and
said second ajusting means and said pivot establish said first axis.

4. The apparatus according to claim 1 wherein:
said biasing means is located on a line extension that lies between said first and second axis at a location remote from said adjusting means and the intersection of said first and second axis.

5. An adjustable light reflective surface for an image projection system having an optical center line comprising:
a base;
a member having a light reflective surface on at least one side thereof;
a pivot extending from said base and in contact with the other side of said member at a point substantially in line with said optical center line;
a first rotational axis and a second rotational axis perpendicular to said first axis;
the intersection of said first axis with said second axis being adjacent said reflective surface and corresponding to said point of contact of said pivot with said other side of said member;
first adjusting means coupled between said member and said base and located in line with said first axis a distance from the intersection of said first and second axis;
second adjusting means coupled between said member and said base and located in line with said second axis a distance from the intersection of said first and second axis;
biasing means coupled to said base and said member and located on a line extension that substantially bisects the angle between said first and second axis;
said biasing means being located along said bisecting line remote from the intersection of said first and second axis and said first and second adjusting means.

6. The apparatus according to claim 5 further including:
an opening in said member;
said biasing means including a post secured to said base and extending through said opening;
said post having a flanged portion at the end thereof remote from said base;
spring means interposed between said flanged portion and said member for urging said member against said pivot.

7. The apparatus according to claim 5 further including:
first and second openings in said member;
said first and second adjusting means including an adjustable screw extending through each said opening and in threaded engagement with said base.

8. The apparatus according to claim 5 wherein:
said light reflecting surface includes a mirror secured to said member.

* * * * *